(12) United States Patent
Perry et al.

(10) Patent No.: US 7,254,044 B2
(45) Date of Patent: Aug. 7, 2007

(54) CURRENT LIMIT CIRCUIT AND POWER SUPPLY INCLUDING SAME

(75) Inventors: Marty Perry, Tucson, AZ (US); Ian Poynton, Marana, AZ (US)

(73) Assignee: Artesyn Technologies, Inc., Boca Raton, FL (US)

( * ) Notice: Subject to any disclaimer, the term of this patent is extended or adjusted under 35 U.S.C. 154(b) by 72 days.

(21) Appl. No.: 11/033,187

(22) Filed: Jan. 11, 2005

(65) Prior Publication Data

US 2006/0152203 A1 Jul. 13, 2006

(51) Int. Cl.
*H02M 3/335* (2006.01)
(52) U.S. Cl. .......................... 363/20; 363/89; 323/299
(58) Field of Classification Search ............ 363/16–20, 363/41, 131, 132, 21.6, 21.12, 89, 97, 56, 363/40, 95, 98, 53; 323/222, 299
See application file for complete search history.

(56) References Cited

U.S. PATENT DOCUMENTS

| | | | |
|---|---|---|---|
| 5,285,366 A * | 2/1994 | Zaretsky | 363/56.1 |
| 5,821,740 A | 10/1998 | Hodgins et al. | |
| 5,828,558 A * | 10/1998 | Korcharz et al. | 363/20 |
| 6,157,555 A | 12/2000 | Hemena et al. | |
| 6,343,026 B1 | 1/2002 | Perry | |
| 6,438,007 B1 | 8/2002 | Pilukaitis et al. | |
| 6,498,466 B1 | 12/2002 | Edwards | |
| 6,636,025 B1 | 10/2003 | Irissou | |
| 6,781,357 B2 | 8/2004 | Balakrishnan et al. | |
| 6,809,678 B2 * | 10/2004 | Vera et al. | 341/166 |
| 6,833,692 B2 | 12/2004 | Balakrishnan et al. | |
| 2001/0019492 A1 | 9/2001 | Burton | |
| 2003/0043601 A1 | 3/2003 | Balakrishnan et al. | |
| 2004/0071001 A1 | 4/2004 | Balakrishnan et al. | |

* cited by examiner

*Primary Examiner*—Rajnikant B. Patel
(74) *Attorney, Agent, or Firm*—Kirkpatrick & Lockhart Preston Gates Ellis LLP (57) ABSTRACT

The present invention is directed generally to a power supply. According to various embodiments, the power supply includes at least one DC/DC converter. The converter includes a primary switch controlled by a pulse width modulated control signal such that the primary switch is on for a D time period of each switching cycle of the converter and is off for a 1-D time period of each switching cycle. Also, the power supply includes a current sensing element connected in series with the primary switch. In addition, the power supply includes a current limit circuit connected to the current sensing element. The current limit circuit includes a functional circuit having a first input responsive to a first signal whose voltage is proportional to the output current of the converter during the D time period of the switching cycle of the converter. A second input of the functional circuit is responsive to a second signal whose voltage is proportional to the output current of the converter during the 1-D time period of the switching cycle of the converter. In that way, the voltage of the output signal of the functional circuit is proportional to the output inductor current of the converter over both the energy storage phase (the D interval) and the energy deliver phase (the 1-D) interval of the converter.

20 Claims, 9 Drawing Sheets

CURRENT LIMIT CIRCUIT AND POWER SUPPLY INCLUDING SAME

BACKGROUND

1. Field of the Invention

The present invention relates generally to DC-DC power conversion.

2. Background of the Invention

DC-to-DC power converters are power-processing circuits that convert an unregulated input DC voltage to a regulated DC output voltage. Switched-mode DC-to-DC power converters typically include an inverter, a transformer having a primary winding coupled to the inverter, a rectifying circuit coupled to a secondary winding of the transformer, and a filter connected between the rectifying circuit and the load. The inverter typically includes a pulse width modulated (PWM) switching device (i.e., the primary switch), such as a MOSFET, that converts the DC input voltage to an alternating voltage, which is magnetically coupled from the primary winding of the transformer to the secondary winding. A PWM control circuit regulates conduction of the PWM switching device. The rectifying circuit rectifies the alternating voltage on the secondary winding.

In some applications it is desirable measure the output current of the converter such that the delivered output current can be controlled. For example, if an overcurrent condition exists at the output, the duty cycle of the primary switch may be reduced. In DC-DC converters that are of an isolated type, direct information related to the input current can be easily derived. This is typically done using current sensing resistors or current sensing transformers located in the primary switch current path. Sensors of this type provide information related to the input current or current in the power inductor during the D or energy storage state of the power converter. Since the slope of the output current of the converter (e.g., the current through an inductor of the output filter circuit) is related to the operating point of the converter, attempting to control the output current of a power converter with only the D state information can result in considerable errors.

The use of a resistor as the current sensing element has several advantages, including cost and size. It is therefore desirable to deploy a current sensing resistor as the sensing element. Unfortunately, to manage the power dissipation in the sensing element the developed voltage must be minimized. In an optimized sensor circuit the developed voltage is well below the forward conduction drop of silicon diodes and in general makes direct signal processing difficult and replete with parasitic error terms.

Therefore, there exists a need for a current sensor processing means that develops the average current output of a DC-DC converter using the D state signal information. Additionally, there exists a need for such a processing means that directly interfaces with resistive sensing elements.

SUMMARY

In one general aspect, the present invention is directed to a power supply. According to various embodiments, the power supply includes at least one DC/DC converter. The converter includes a primary switch controlled by a pulse width modulated control signal such that the primary switch is on for a D time period of each switching cycle of the converter and is off for a 1-D time period of each switching cycle. Also, the power supply includes a current sensing element connected in series with the primary switch. In addition, the power supply includes a current limit circuit connected to the current sensing element. The current limit circuit includes a functional circuit having a first input responsive to a first signal whose voltage is proportional to the output current of the converter during the D time period of the switching cycle of the converter. A second input of the functional circuit is responsive to a second signal whose voltage is proportional to the output current of the converter during the 1-D time period of the switching cycle of the converter. In that way, the voltage of the output signal (referred to as "Iout" herein) of the subtraction circuit is proportional to the output current of the converter over both the energy storage phase (the D interval) and the energy deliver phase (the 1-D interval) of the converter.

The functional circuit may be, for example, a subtraction circuit, a differential summing circuit, an inverter circuit or an integrator/comparator circuit, and may be embodied using an operational-amplifier.

The power supply may further include a control circuit connected to the current limit circuit. The current limit circuit may generate the pulse width modulated (PWM) control signal to control the primary switch of the converter. Also, the current limit circuit may include an averaging circuit connected to the functional circuit. The averaging circuit may average the output signal (Iout) of the functional circuit to generate a signal ($\overline{I_{out}}$) indicative of the average output current of the converter. The control circuit may monitor the $\overline{I_{out}}$ signal to detect for overcurrent conditions at the output of the converter, in which case the control circuit may reduce the duty cycle of the primary switch.

The current limit circuit may include an auxiliary switch connected to the second input of the functional circuit. The auxiliary switch may be driven synchronously with the primary switch of the converter. That is, both the auxiliary switch and the primary switch may be driven with the same PWM control signal. The current limit circuit may further include a capacitor and a current source connected to the second input of the functional circuit. The current source may charge the capacitor during the off period of the auxiliary switch at a rate proportional to the output voltage of the converter. In this way, the signal whose voltage is proportional to the output current of the converter during the 1-D interval may be developed.

According to various implementations, the converter may be a forward converter, a flyback converter, a buck converter, a boost converter, a buck-boost converter or combinations thereof. The current limit circuit is also extendable to power supplies having a number of interleaved power converters. Also, the current sensing element may be a resistor or a current sense transformer.

DESCRIPTION OF THE FIGURES

Various embodiments of the present invention are described herein by way of example in conjunction with the following figures, wherein.

DETAILED DESCRIPTION

Figure 1:
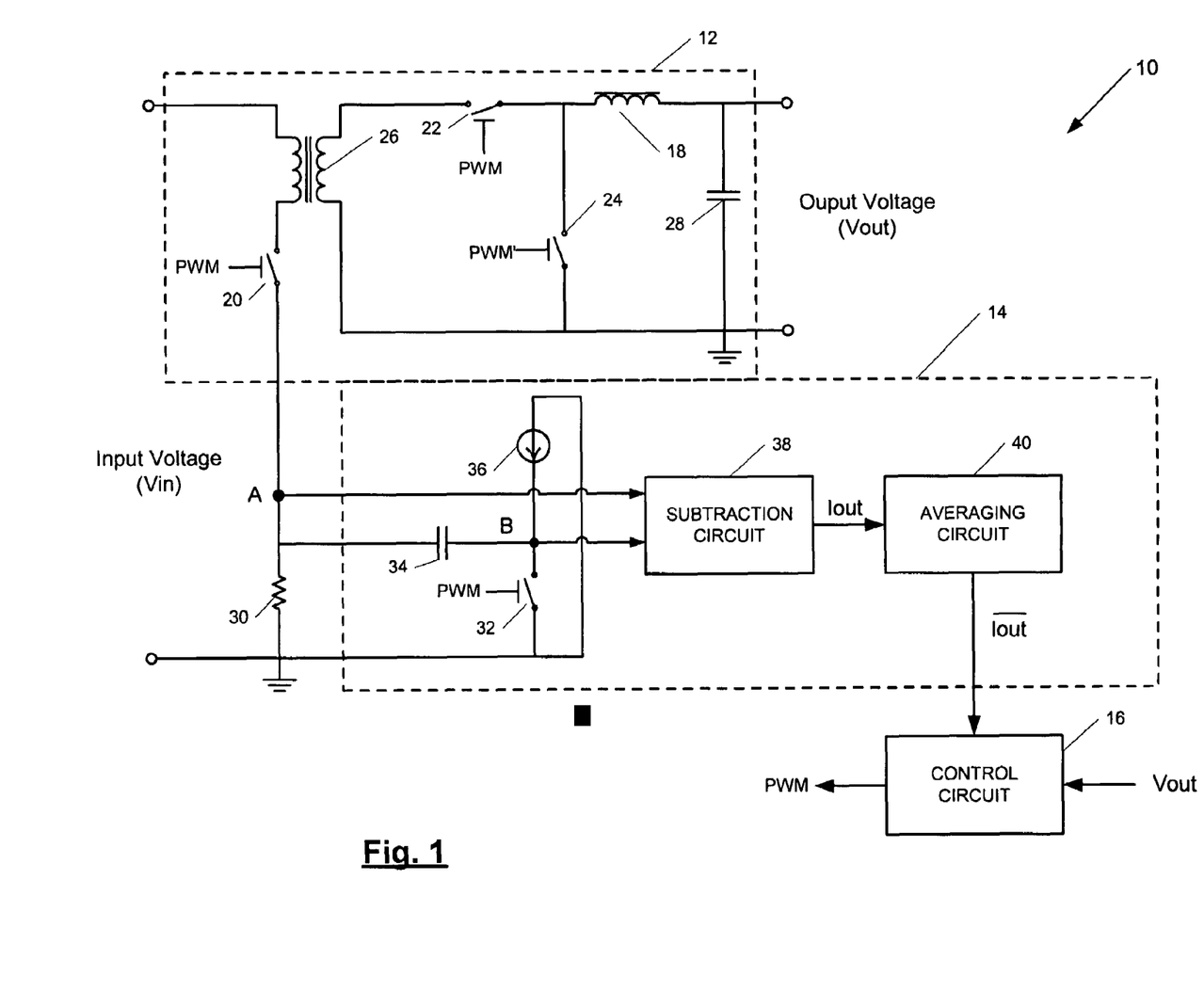
FIGS. 1, 3A, 4-6 and 8 are diagrams showing power supplies according to various embodiments of the present invention.
Figure 2:
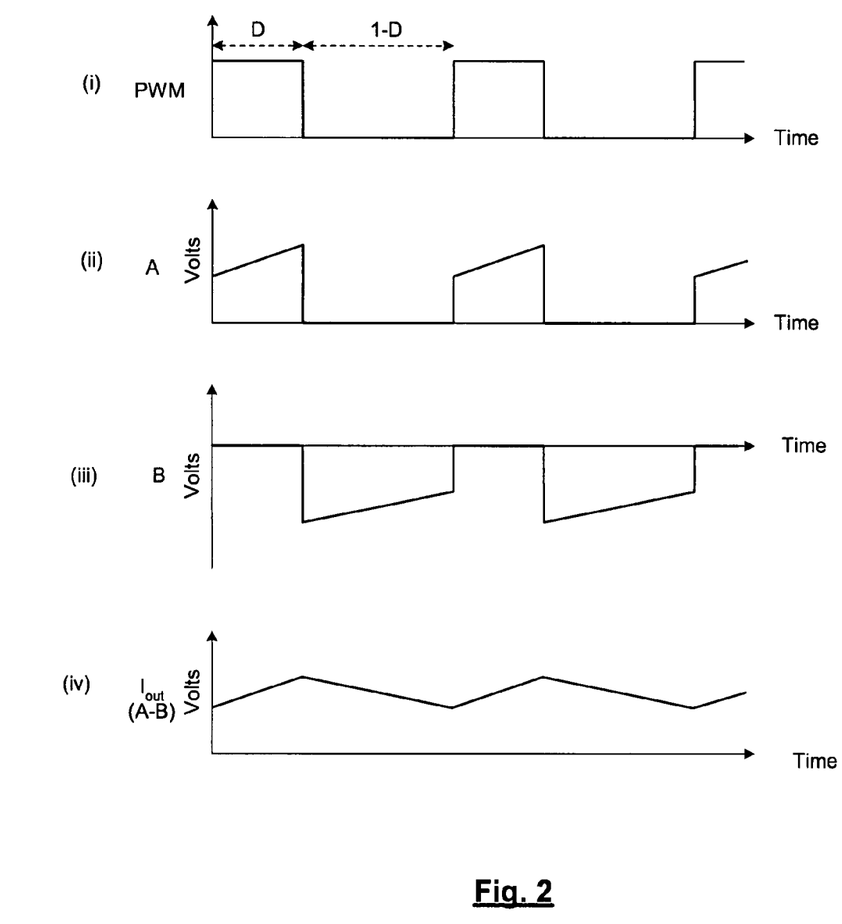
FIGS. 2, 3B and 7 contain idealized voltage waveforms of various signals that illustrate, in general, the operation of the power supplies according to various embodiments of the present invention.

FIG. 1 is a diagram of a power supply 10 according to various embodiments of the present invention and FIGS. 2(i)-(iv) are idealized voltage waveforms illustrating the operation of the power supply 10. The power supply 10 includes a DC/DC converter 12 that converts an input voltage (Vin) to an output voltage (Vout) for powering a load (not shown). The power supply 10 also includes a current limit circuit 14 and a control circuit 16. The current limit circuit 14 is for developing, according to various embodiments, a signal ($\overline{I_{out}}$) whose voltage is proportional to the average output current of the converter 12 (e.g., the current through output inductor 18). The control circuit 16 may generate a pulse width modulated control signal (PWM) based on either the output voltage or the output current of the converter 12 to control the various switches of the power supply 10, including the primary input switch 20. That is, the control circuit 16 may modulate the duty cycle (D) of the PWM signal to thereby control the output current and/or output voltage of the converter 12 such that it approaches a desired level. The $\overline{I_{out}}$ signal may also be supplied to the control circuit 16 such that overcurrent conditions at the output may be detected, in which case the control circuit 16 may reduce the duty cycle of the PWM signal controlling the primary switch 20.

In FIG. 1, the DC/DC converter 12 is shown as a single ended forward converter. In such a converter, the primary input switch 20 is cyclically turned on and off. The ratio, or duty cycle, of the on period (referred to as the D period) of the switch 20 to the off period (referred to as the 1-D period) is controlled by the PWM signal from the control circuit 16. During the D state, in general, the primary switch 20 as well as the synchronous rectifier 22 are closed (i.e., on) and the synchronous rectifier 24 is open (i.e., off). As such, the output inductor 18 is connected to the input source (Vin) via the transformer 26 and the output voltage on the output capacitor 28. The synchronous rectifier 24 is driven, in general, oppositely from the synchronous rectifier 22 (and also the primary switch 20). As such, the synchronous rectifier 24 may be driven by an inverted version of the PWM signal (i.e., PWM', as shown in FIG. 1). Thus, during the 1-D state, in general, the primary switch 20 and the synchronous rectifier 22 are open, and the output current flows through the synchronous rectifier 24, which is closed. It should be noted that different topologies may be used for the converter 12 as the invention is applicable to any converter that can generally be described as buck, boost or buck-boost derived, including, without limitation, forward, full bridge, half bridge and various combinations thereof. Also, the primary switch 20 and the synchronous rectifiers 22, 24 may be implemented as one or a number of parallel-connected MOSFETs. Further, according to other embodiments, diode rectifiers may be used in place of one or both of the synchronous rectifiers 22, 24.

The power supply 10 additionally includes a current sensing element. As shown in FIG. 1, the current sensing element may be a resistor 30, although other current sensing elements may be used, such as a current sense transformer. The current sensing element 30 may be connected in series with the primary switch 20 such that the same current flows through both elements. Accordingly, during the D state of the converter 12, the current flowing through the primary switch 20 and the current sensing resistor 30 is proportional to the current flowing through the inductor 18 due to the transformer 26. A representation of the current through the current sensing resistor 30 is shown in FIG. 2(ii) as waveform A at an arbitrary operating point. Thus, waveform A in FIG. 2(ii) is a waveform of the voltage at node A in FIG. 1, which is proportional to the waveform of the current through the current sensing resistor 30 and, hence, proportional to the current through the output inductor 18 during the D state.

The current limit circuit 14, according to various embodiments, includes a switch 32 (referred to hereinafter as the "auxiliary switch"), a capacitor 34, a current source 36, a subtraction circuit 38 and an averaging circuit 40. The auxiliary switch 32 may also be controlled with the PWM signal and, as such, may generally open and close with the primary switch 20. The subtraction circuit 38 may have a first input terminal responsive to node A and a second input terminal responsive to a node B, the node at the juncture between the capacitor 34 and the auxiliary switch 32. The subtraction circuit 38 may be implemented using an operational-amplifier, for example, as is known in the art, to subtract the two inputs. Also, the averaging circuit 40 may be implemented using an integrating operational-amplifier configuration, as is known in the art.

As shown by waveform A in FIG. 2(ii), at the start of the D time period, the sensed current jumps to a pedestal value and then ramps upward at a rate proportional to the voltage across the inductor 18 divided by the inductance of the inductor 18. During this interval, the auxiliary switch 32 is closed, as is the primary switch 20. Node B is therefore at return (e.g., ground). The voltage at node B is shown as waveform B in FIG. 2(iii). The subtraction circuit 38 subtracts the voltage at node B from the voltage a node A (i.e., A-B), producing the signal $I_{out}$. Thus, the voltage of signal $I_{out}$ during the D state is equal to the voltage at node A, as shown in waveform $I_{out}$ in FIG. 2(iv).

When the D state interval terminates, switches 20, 22 and 32 are opened and switch 24 is closed. During this interval (the 1-D interval), the current in the inductor 18 ramps down at a rate proportional to the output voltage (Vout). When the primary switch 20 opens the voltage a node A will drop to the return voltage (e.g., 0 volts). Since the auxiliary switch 32 is synchronized with the primary switch 20, the voltage at node B is proportional to the negative of the peak current through the inductor 18 at the instant of the switch transition. Thus, the voltage of $I_{out}$ will correspond to the peak current through the inductor 18 (i.e., A-B=0-(-Vp), wherein Vp is proportional to the peak current in the inductor 18). The current source 36 will then begin to charge the capacitor 34. If the value of the current source 36 charges the capacitor 34 at a rate proportional to the output voltage (Vout), the voltage at node B will be proportional to the inductor current during the 1-D state of the converter 12. Thus, the voltage waveform at node A is proportional to the inductor 18 current during the D state of the power converter 12, and the voltage at node B is proportional to the inductor 18 current during the 1-D state. By subtracting the voltage at node B from the voltage at node A with the subtraction circuit 38, the voltage of the output signal $I_{out}$ corresponds to the inductor 18 current over both the energy storage phase (the D interval) and the energy delivery phase (the 1-D interval) of the converter 12.

If the current source 36 is devised such it is directly proportional to the output voltage of the converter 12 (i.e., α(Vout)), the output of the subtraction circuit 38 will be representative of the load current over all operating points of the converter. This can be done, for example, by using an appropriately sized resistor as the current source 36 in the configuration of FIG. 1. Also, according to other embodiments, a current mirror configuration, or other types of current source configurations, may be used as the current source 36.

According to various embodiments, the $I_{out}$ output signal from the subtraction circuit 38 may be supplied to the averaging circuit 40. The averaging circuit 40 may average the $I_{out}$ signal to thereby generate a signal, $\overline{I_{out}}$, whose voltage is representative of the average output current of the converter 12. The average output current signal, $\overline{I_{out}}$, may be supplied to the control circuit 16, which may reduce the duty cycle of the PWM signal when the average output current signal indicates that an overcurrent condition exists.

Figure 3A:
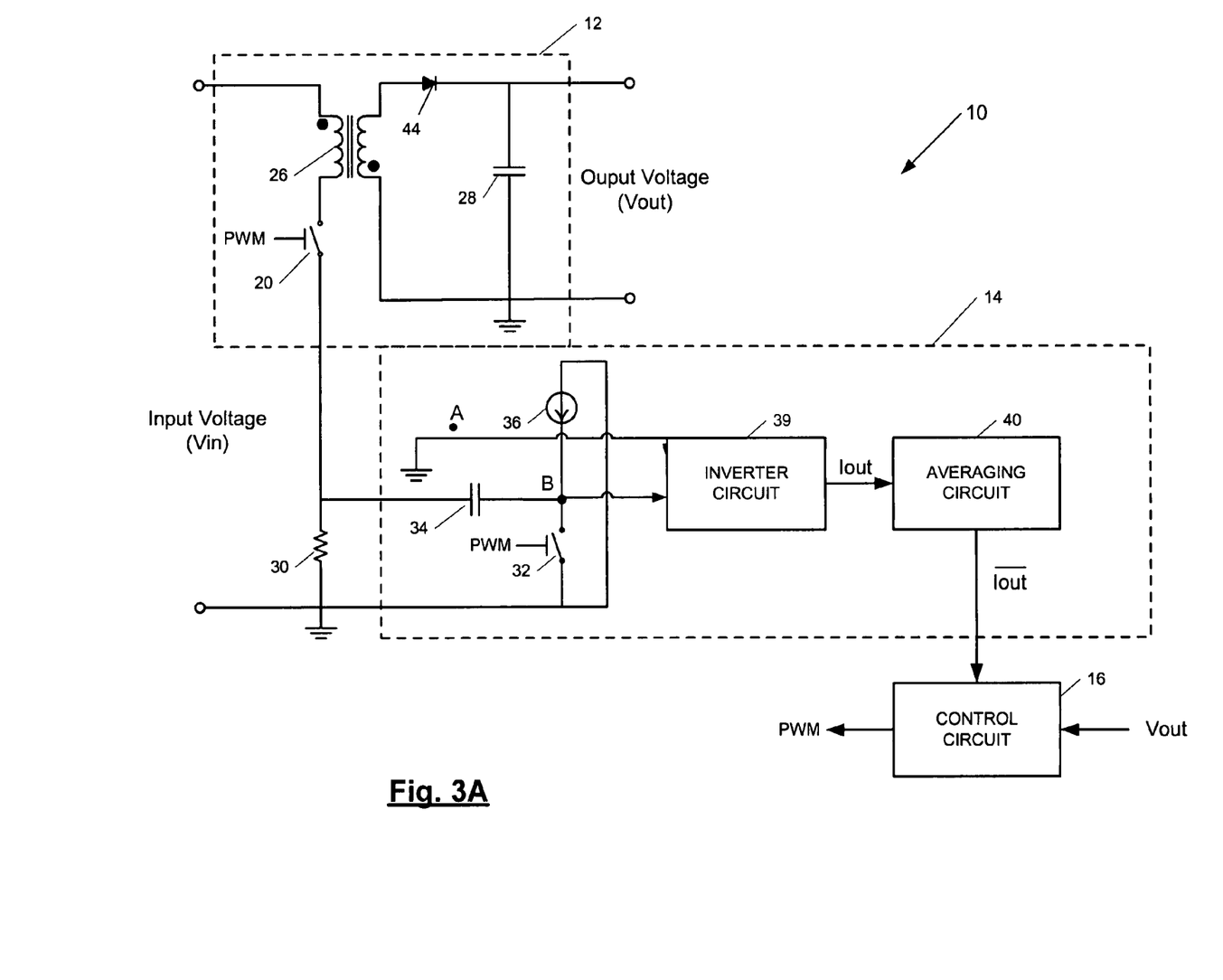

FIG. 3A is a diagram of the power supply 10 where the power converter 12 is a flyback converter. In the illustrated embodiment, the rectifier 44 of the flyback converter 12 is shown as a diode, although it should be recognized that a synchronous rectifier may also be used. For an embodiment where a synchronous rectifier is used for the secondary rectification in such a flyback topology, the synchronous rectifier may be driven, in general, oppositely from the primary switch 20 (e.g., the synchronous rectifier may be driven with the signal PWM'). For a flyback converter, the output current is proportional to the opposite of the voltage at node B. Therefore, an inversion circuit 39 may invert the B signal, i.e., effectively multiply the B signal by −1. According to one embodiment, the inversion circuit 39 may subtract the voltage at node B from zero (i.e., 0−B) to generate the signal ($I_{out}$) representative of the output current of the converter 12. That is, the other input to the subtraction circuit (A) may be connected to return (e.g., ground).

Figure 3B:
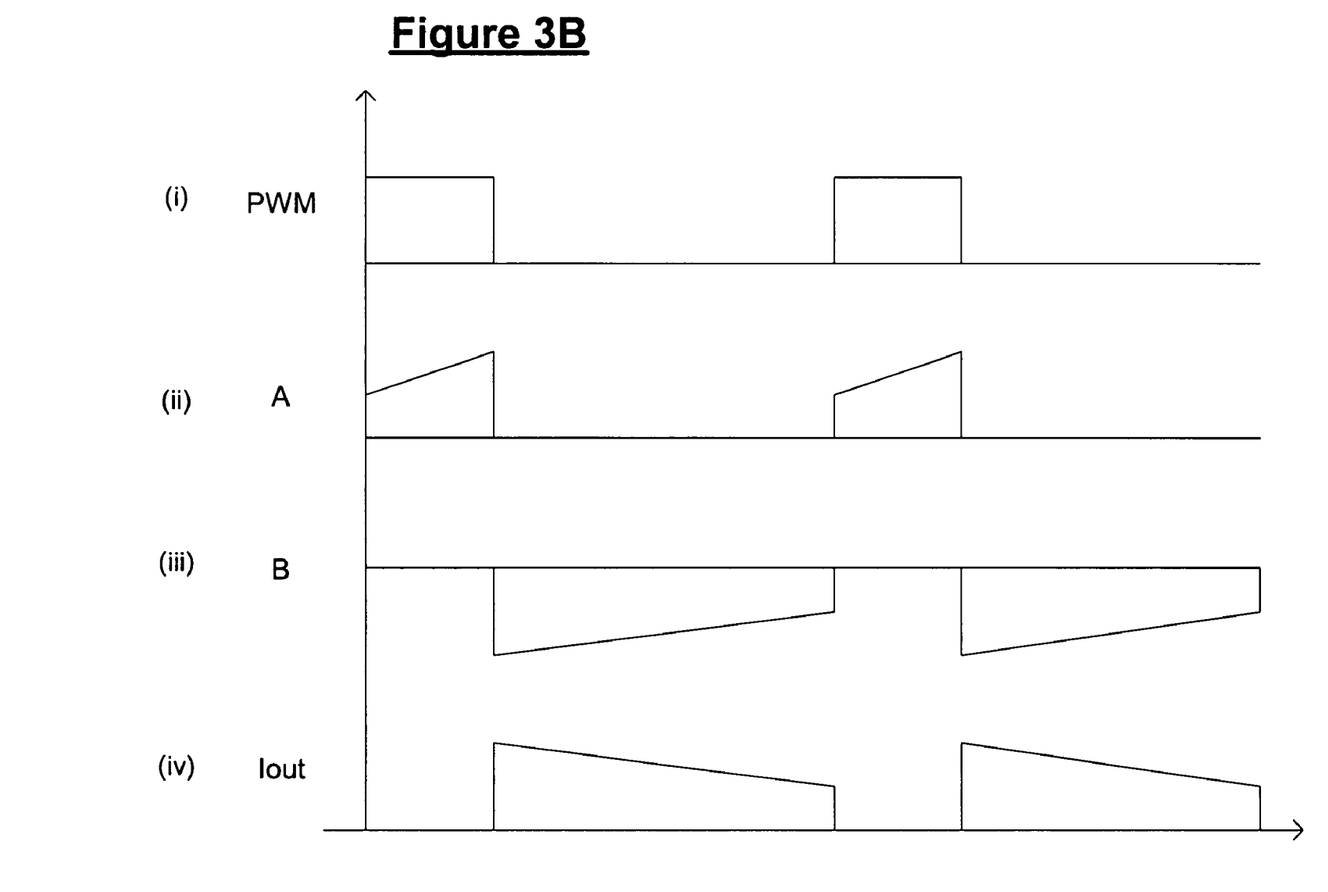

FIGS. 3B(i)-(iv) contain idealized voltage waveforms that generally illustrate the operation of the power supply 10 of FIG. 3A. During the D interval, the auxiliary switch is closed and, as such, the output of the inversion circuit 39 is generally zero. During this interval the peak voltage of node A is stored on the capacitor 34. When the converter changes state to the D-1 interval, the switches 20 and 32 are opened causing the voltage at node B to become negative. The current source 36 then charges the capacitor 34. If the current source 36 is made proportional to the output voltage (i.e., α(Vout)) the output of the inverter circuit 39 can be made proportional to the output current.

Figure 4:
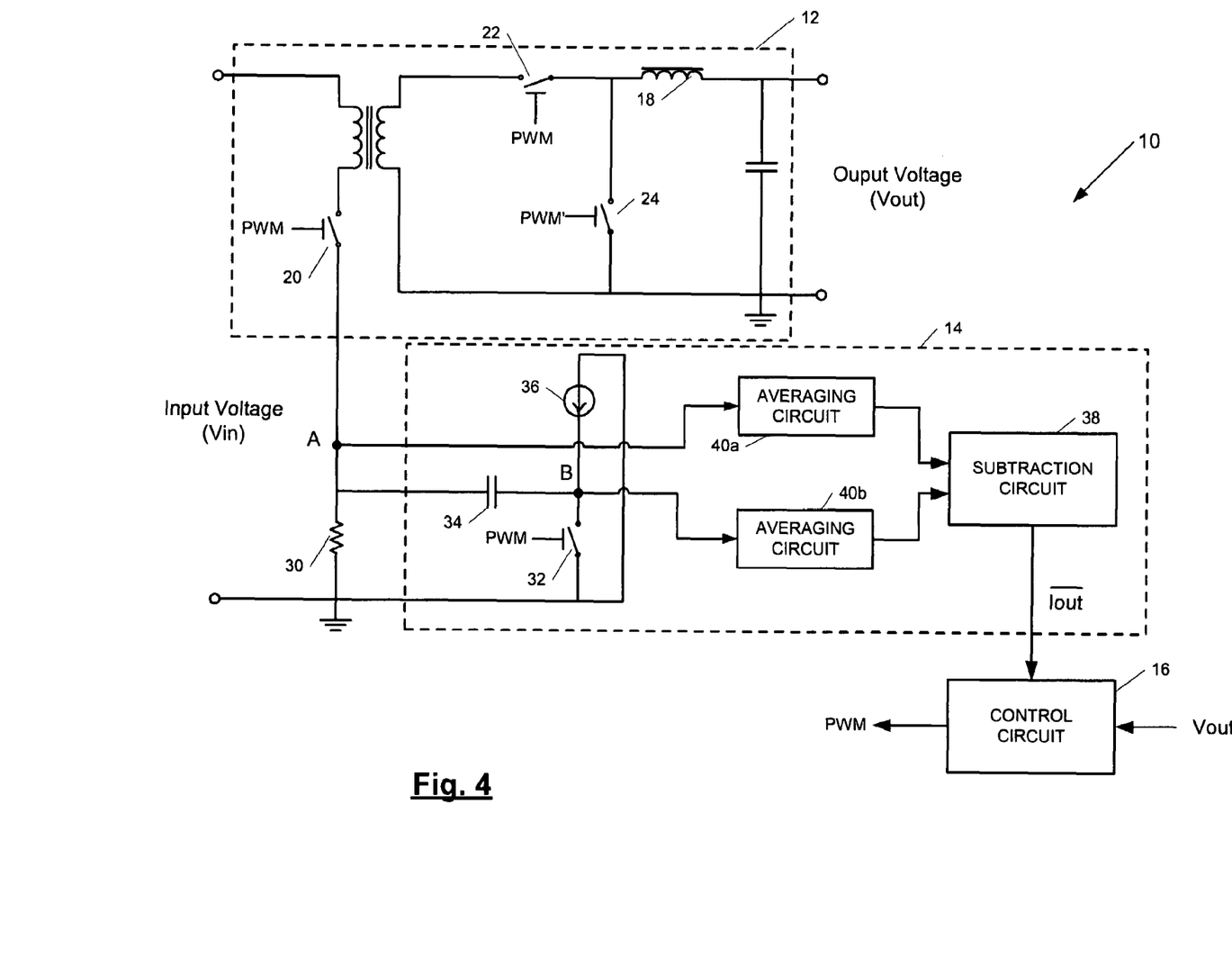

FIG. 4 is a diagram of the current limit circuit 14 according to another embodiment of the present invention. The embodiment of FIG. 4 is similar to that of FIG. 1, except that the current limit circuit 14 includes two averaging circuits $40_A$, $40_B$. The two averaging circuits $40_A$, $40_B$ may average the voltage waveforms at nodes A and B respectively before the subtraction operation by the subtraction circuit 38.

Figure 5:
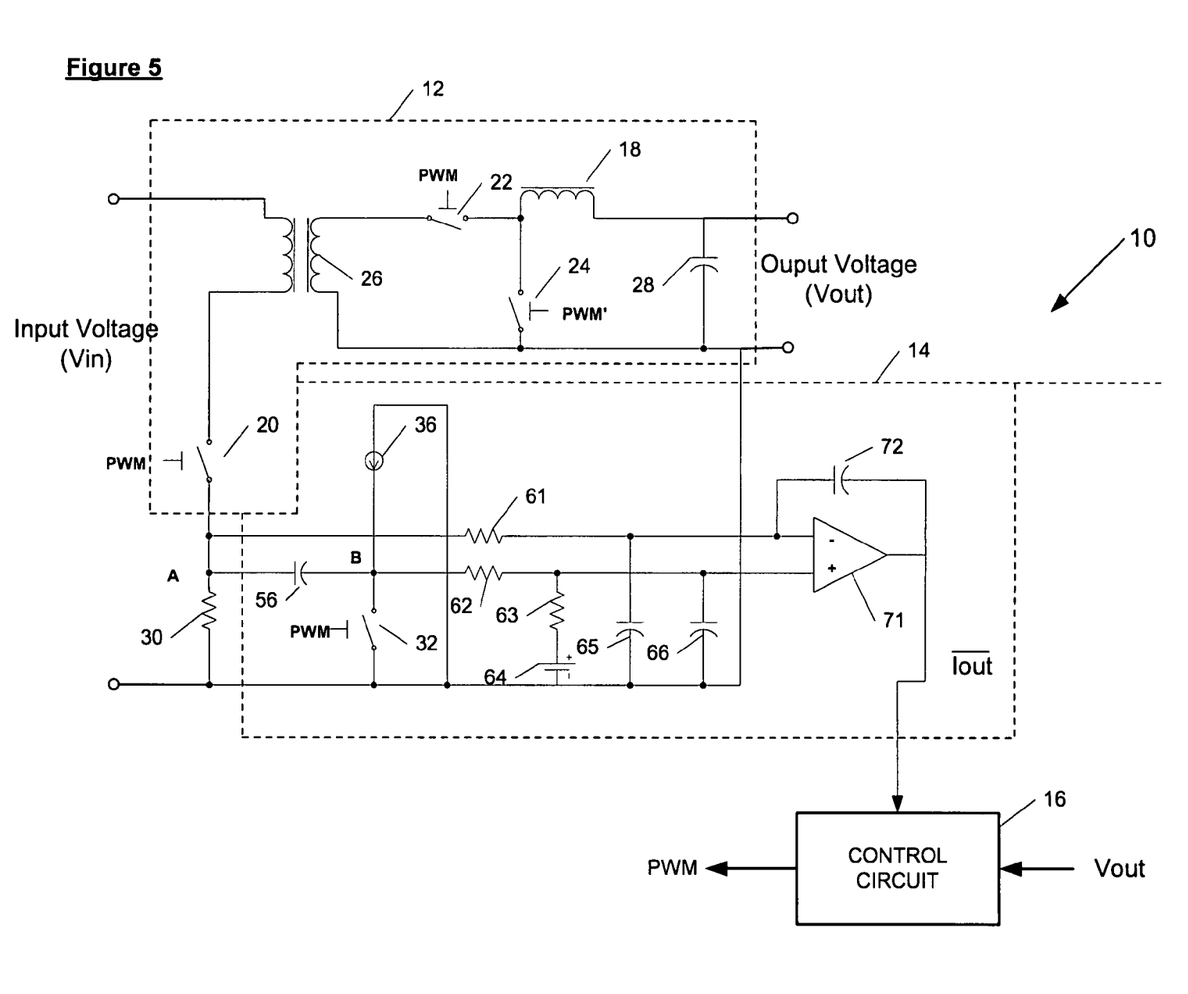

FIG. 5 discloses an alternative way to implement the subtraction circuit 38 of FIG. 1. In this embodiment, the signals A and B are integrated via low-pass elements comprising the resistor 61—capacitor 65 circuit and the resistor 62—capacitor 66 circuit. An additional bias signal is provided by the resistor 63 and the source 64. An op-amp 71, with feedback capacitance 72, is configured as an integrator/comparator allowing an over-current function to be implemented. The bias signal from the source 64 may be implemented such that the sum at the positive input to the op-amp 71 is positive at an output current of zero amps. As the load is increased the positive input of the op-amp 41 becomes more negative and the negative input becomes more positive. At the desired current limit point the inputs of the op-amp 41 may be equal. At this time the op-amp 41 will begin to pull towards its negative rail. If the output of the op-amp 41 is mechanized such that a negative-going signal on its output results in a reduction in the pulse width of the D state, a constant current limit function is realized. Also, no averaging circuit is needed in this embodiment because the op-amp configuration can perform the averaging function.

Figure 6:
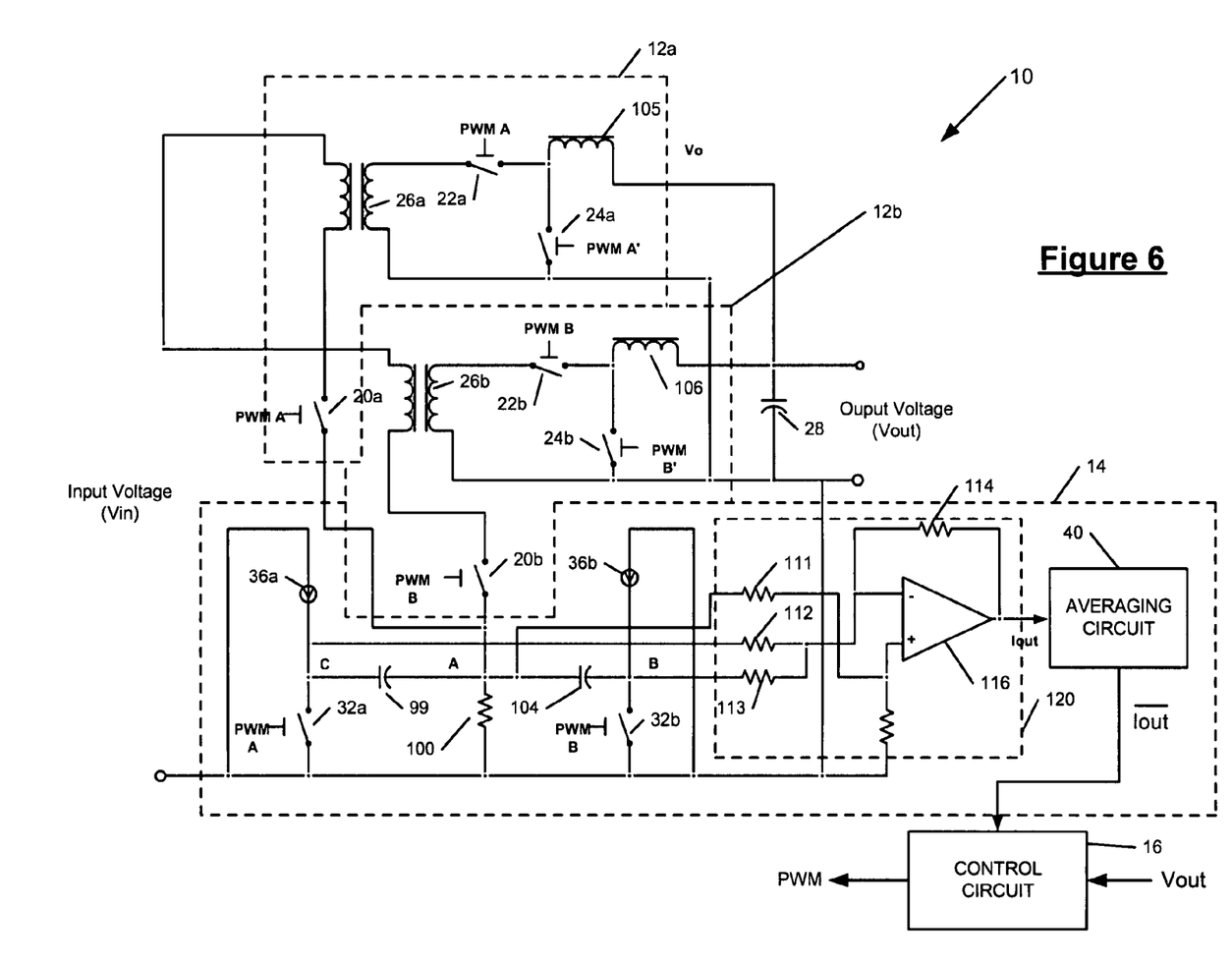
Figure 7:
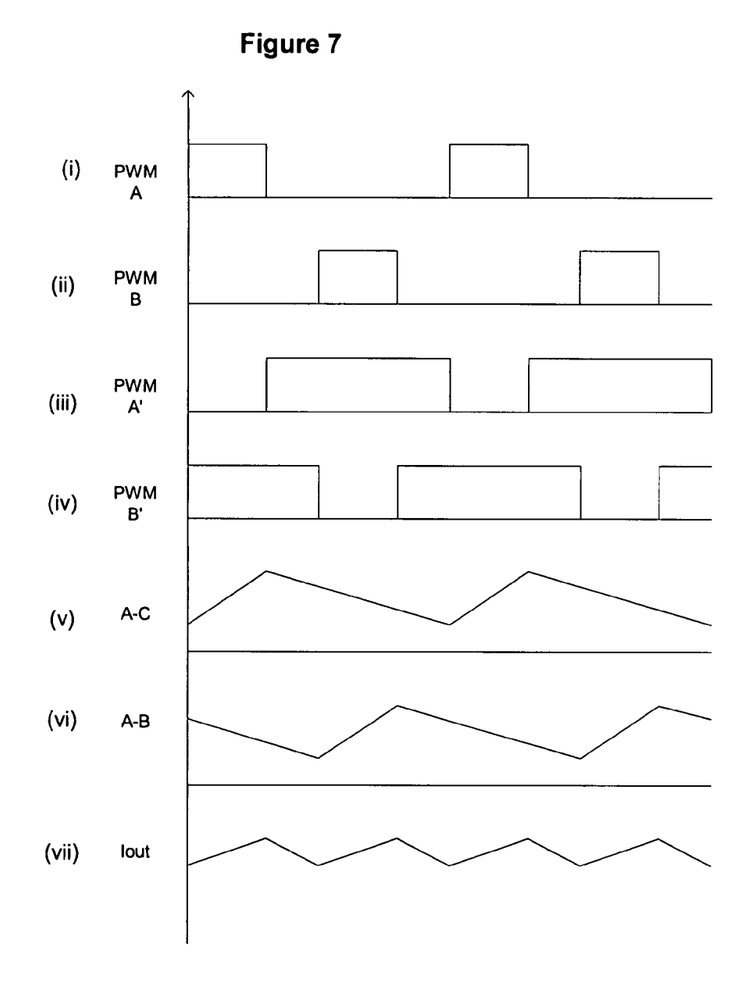

FIG. 6 is a diagram of the power supply 10 according to other embodiments of the present invention and FIGS. 7(i)-(vii) include idealized voltage waveforms illustrating the operation of the power supply of FIG. 6. The embodiment of FIG. 6 includes two interleaved power converters 12a, 12b that may operate 180° out of phase. That is, for example, the primary switch 20a of the first converter 12a may be controlled by the PWM signal, and the primary switch 20b of the second converter 12b may be controlled by an inverted version of the PWM signal (PWM'). In FIG. 6 the converters 12a, 12b are shown as single-ended forward converters, although other converter types may be employed. The operation of interleaved forward converters is known in the art and, therefore, not further discussed here.

Operation of the current limit circuit 14 for an interleaved embodiment may best be understood by the examining the differential voltage on the sensing capacitors 99, 104. The differential voltage on the sensing capacitor 99 is shown as A-C in FIG. 7(v) and the differential voltage on the sensing capacitor 104 is shown as A-B in FIG. 7(vi). The differential voltages on the sensing capacitors 99, 104 are proportional to the currents in the inductors 105, 106, respectively, of the converters 12a, 12b. The output current Iout from the differential summing circuit (configured using, e.g., an op-amp 116) is therefore the vector sum of the inductor currents (i.e., the currents through the inductors 105, 106). It follows therefore that a representation of the output current can be realized by the differential summation of the voltage across the sensing capacitors 99, 104. The op-amp 116 and the resistors 111, 112, 113, 114, 115 form a differential summing circuit 120. The output of the differential summing circuit 120 is shown in FIG. 7(vii) as the signal Iout. The signal Iout is proportional to the combined output currents of the two output inductors 105, 106, therefore, represents the combined output current of the interleaved converters 12a, 12b.

Such a current limit circuit 14 may be used for other types of converter configurations besides interleaved converters, including, for example, a full wave coupled converter, a converter including a current doubler, etc. Also, the embodiment of FIG. 6 may also be extended to N interleaved converters, each converter operating 360°/N apart, for example.

Figure 8:
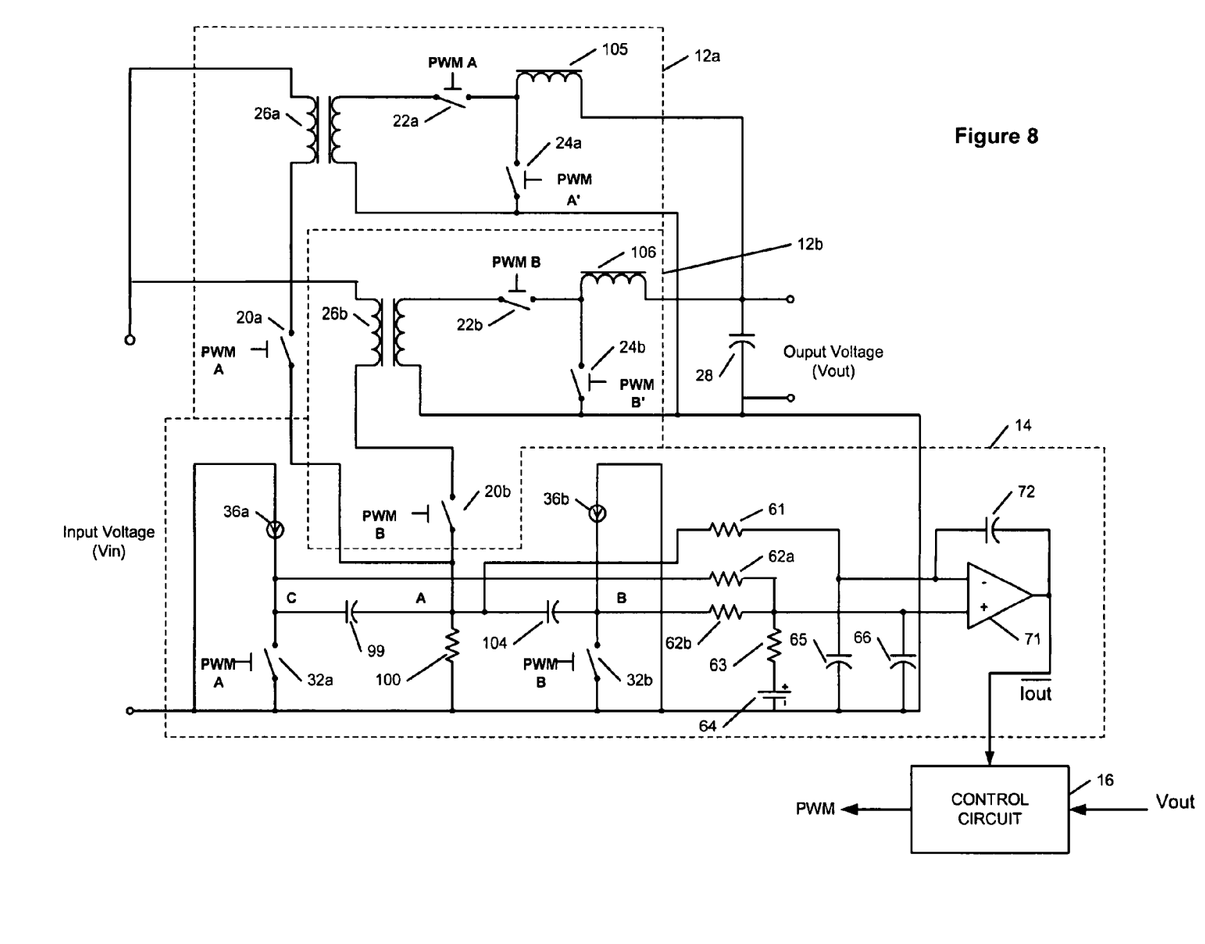

FIG. 8 discloses another embodiment for the current limit circuit 14 for a power supply 10 including interleaved converters 12a, 12b. The current limit circuit 14 of FIG. 8 extends the integrator/comparator configuration of FIG. 5 to the interleaved case.

As used herein, a semiconductor switch is "on" or "closed" when it is in a low-impedance state and is "off" or "open" when it is in a high-impedance state. Also, the term "connected" means having an electrical connection and does not necessarily imply a direct connection; that is, if element S is "connected" to element T, element V could be connected between S and T. Also, all switches referred to herein may be implemented using one or more paralleled transistors, such as MOSFETs or IGBTs, for example.

Although the present invention has been described herein with respect to certain embodiments, those of ordinary skill in the art will recognize that many modifications and variations of the present invention may be implemented. For example, the transformer 26 may include multiple primary, secondary, or tertiary windings. In addition, the power converter 12 may include a mechanism for resetting the core of the transformer 26. The foregoing description and the following claims are intended to cover all such modifications and variations.

What is claimed is:

1. A power supply comprising:
    at least one converter, the converter comprising at least one primary switch controlled by a pulse width modulated control signal such that the primary switch is on for a D time period of each switching cycle of the converter and is off for a 1-D time period of each switching cycle;
    a current sensing element connected in series with the primary switch;
    a current limit circuit connected to the current sensing element, wherein the current limit circuit includes a functional circuit having a first input responsive to a first signal whose voltage is proportional to the output current of the converter during the D time period of the switching cycle of the converter and having a second input responsive to a second signal whose voltage is proportional to the output current of the converter during the 1-D time period of the switching cycle of the converter; and
    a control circuit connected to the current limit circuit and having an output terminal connected to the control terminal of the primary switch of the converter.

2. The power supply of claim 1, wherein the functional circuit includes a subtraction circuit.

3. The power supply of claim 1, wherein the functional circuit includes an inverter circuit.

4. The power supply of claim 1, wherein the functional circuit includes an integrator/comparator circuit.

5. The power supply of claim 1, wherein the at least one converter includes at least one of a forward converter, a flyback converter, a buck converter, a boost converter and a buck-boost converter.

6. The power supply of claim 1, wherein the current sensing element includes a resistor.

7. The power supply of claim 1, wherein the first input of the functional circuit is connected to a node between the primary switch and the current sensing element.

8. The power supply of claim 1, wherein the first input of the functional circuit is connected to the return for the converter.

9. The power supply of claim 1, wherein the current limit circuit further includes an averaging circuit, wherein an input terminal of the averaging circuit is connected to an output terminal of the functional circuit, and an output terminal of the averaging circuit is connected to an input terminal of the control circuit.

10. The power supply of claim 1, wherein the current limit circuit further includes an auxiliary switch connected to the second input of the functional circuit, wherein the auxiliary switch is driven synchronously with the primary switch of the converter.

11. The power supply of claim 10, wherein the current limit circuit further includes a capacitor and a current source connected to the second input of the functional circuit, such that the current source charges the capacitor during the off period of the auxiliary switch.

12. The power supply of claim 11, wherein current source charges the capacitor at a rate proportional to the output voltage of the converter.

13. The power supply of claim 1, wherein the functional circuit includes an operational-amplifier.

14. A power supply comprising:
    a first converter, wherein the first converter includes a first primary switch controlled by a first pulse width modulated control signal;
    a second converter connected in parallel with the first converter, wherein the second converter includes a second primary switch controlled by a second pulse width modulated control signal, wherein the second pulse width modulated control signal is a phase-shifted version of the first pulse width modulated control signal;
    a current sensing element connected to the first and second primary switches;
    a current limit circuit connected to the current sensing element, wherein the current limit circuit includes:
        a first sensing capacitor connected to the current sensing element, wherein the voltage across the first sensing capacitor is proportional to the current through an output inductor of the first converter;
        a second sensing capacitor connected to the current sensing element, wherein the voltage across the second sensing capacitor is proportional to the current through an output inductor of the second converter; and
        a functional circuit responsive to the voltages across the first and second sensing capacitors; and
    a control circuit connected to the current limit circuit and having an output terminal connected to the control terminal of the first primary switch of the first converter and to the control terminal of the second primary switch of the second converter.

15. The power supply of claim 14, wherein functional circuit includes a differential summing circuit having a first input responsive to a current source, and having a second input responsive to the voltage across the first and second sensing capacitors.

16. The power supply of claim 14, wherein the functional circuit includes an integrator/comparator having a first input responsive to the voltage across the first sensing capacitor, and having a second input responsive to the voltage across the second sensing capacitor.

17. The power supply of claim 14, wherein the current limit circuit further includes:
    a first auxiliary switch connected to the first sensing capacitor, wherein the first auxiliary switch is driven synchronously with the first primary switch of the first converter; and
    a second auxiliary switch connected to the second sensing capacitor, wherein the second auxiliary switch is driven synchronously with the second primary switch of the second converter.

18. A current limit circuit for a power supply, wherein the power supply includes at least one primary switch controlled by a pulse width modulated control signal such that the primary switch is on for a D time period of each switching cycle of the converter and is off for a 1-D time period of each switching cycle, the current limit circuit comprising:
    a functional circuit having a first input responsive to a first signal whose voltage is proportional to the output current of the converter during the D time period of the switching cycle of the converter and having a second input responsive to a second signal whose voltage is proportional to the output current of the converter during the 1-D time period of the switching cycle of the converter.

19. The current limit circuit of claim 18, wherein the current limit circuit further includes an averaging circuit, wherein an input terminal of the averaging circuit is connected to an output terminal of the functional circuit.

20. The current limit circuit of claim 19, wherein the current limit circuit further includes:

an auxiliary switch connected to the second input of the functional circuit, wherein the auxiliary switch is driven synchronously with the primary switch of the converter;

a capacitor and a current source connected to the second input of the functional circuit, such that the current source charges the capacitor at a rate proportional to the output voltage of the converter during the off period of the auxiliary switch.

* * * * *